United States Patent [19]

Wiesmann

[11] Patent Number: 4,507,253
[45] Date of Patent: Mar. 26, 1985

[54] EQUIPMENT FOR GASSING A LIQUID AND PROCESS FOR OPERATING THE EQUIPMENT

[75] Inventor: Rudolf Wiesmann, Gossau, Switzerland

[73] Assignee: BBC Brown, Boveri & Company, Limited, Baden, Switzerland

[21] Appl. No.: 462,364

[22] Filed: Jan. 31, 1983

[30] Foreign Application Priority Data

Feb. 9, 1982 [CH] Switzerland .................. 780/82

[51] Int. Cl.³ .............................................. B01F 3/04
[52] U.S. Cl. .................................. 261/22; 210/221.2; 210/760; 261/77; 261/113; 261/117; 261/123; 261/DIG. 42
[58] Field of Search ................. 261/22, 36 R, 77, 113, 261/117, 123, DIG. 42, DIG. 75, 87, 93; 210/221.2, 760; 366/101, 102; 209/170

[56] References Cited

U.S. PATENT DOCUMENTS

| | | | |
|---|---|---|---|
| 1,047,534 | 12/1912 | Joseph | 210/760 X |
| 2,055,808 | 9/1936 | Wait | 210/760 |
| 3,202,281 | 8/1965 | Weston | 261/123 X |
| 3,452,966 | 7/1969 | Smolski | 261/123 X |
| 3,476,366 | 11/1969 | Brooks et al. | 261/123 X |
| 3,804,255 | 4/1974 | Speece | 210/221.2 X |
| 3,945,918 | 3/1976 | Kirk | 210/760 X |
| 4,043,771 | 8/1977 | Anand | 261/77 X |
| 4,051,204 | 9/1977 | Muller et al. | 261/123 X |
| 4,282,172 | 8/1981 | McKnight | 261/DIG. 42 |

*Primary Examiner*—Richard L. Chiesa
*Attorney, Agent, or Firm*—Oblon, Fisher, Spivak, McClelland & Maier

[57] ABSTRACT

Equipment for gassing a liquid, preferably for the ozonization of water, comprises two gassing stages. In the first gassing stage, a part of the liquid to be treated and the process gas are introduced by means of a submerged gas distributor (6) into a bubble column having an inner chamber and an outer chamber. The major part of the liquid is fed to the second gassing stage which has a shower tray and is located above the first gassing stage. From the shower tray, the "depleted" process gas leaving the two chambers comes into interaction with the "fresh" liquid. Gassing of the liquid at a high absorption efficiency of up to about 95% is achieved in this technically simple and at the same time economical way.

9 Claims, 1 Drawing Figure

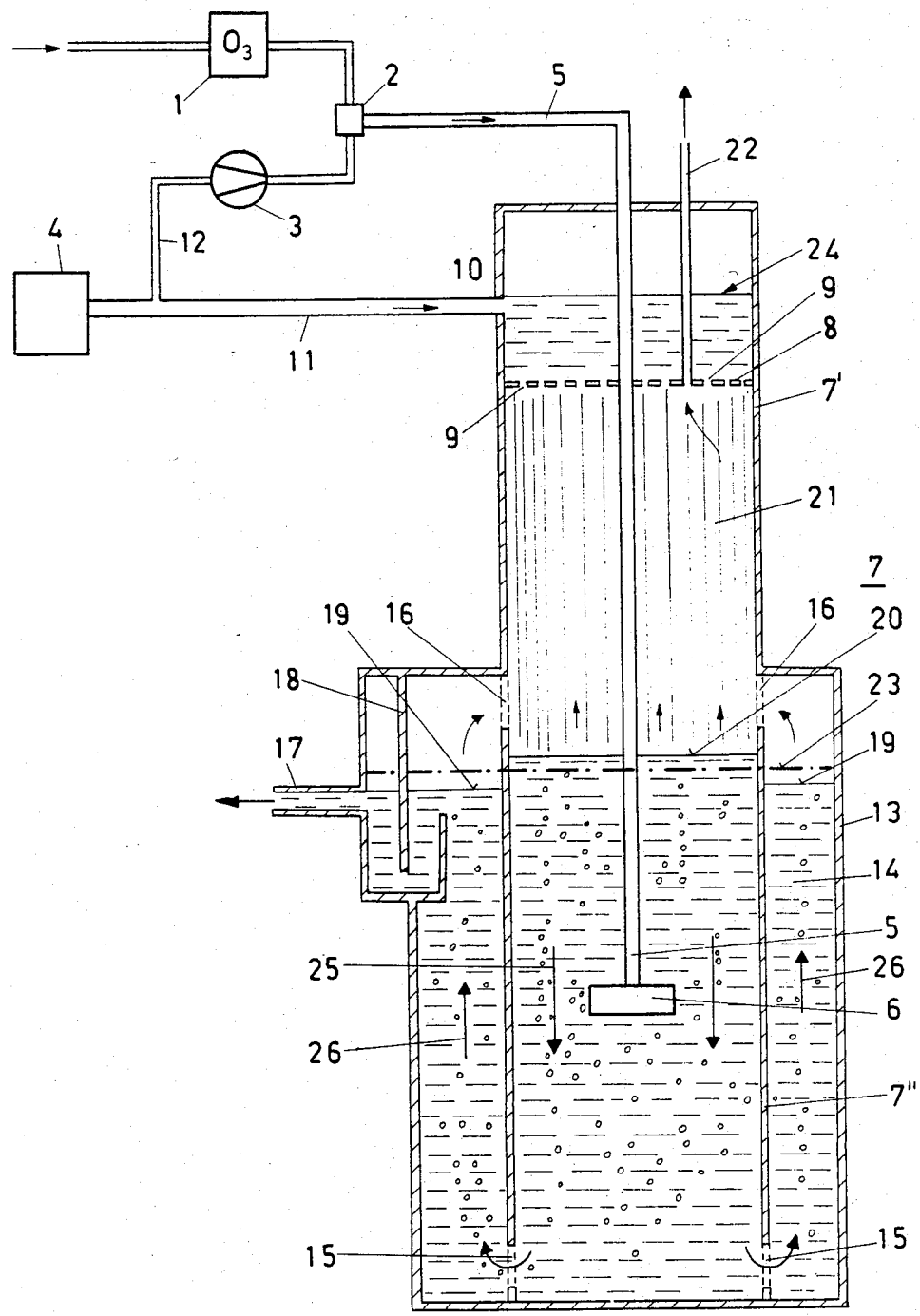

EQUIPMENT FOR GASSING A LIQUID AND PROCESS FOR OPERATING THE EQUIPMENT

FIELD OF THE INVENTION

The invention relates to equipment for gassing a liquid with ozone or an ozone-containing gas. The equipment comprises a first gassing stage with a bubble column into which the process gas can be introduced by means of a submerged gas distributor. The invention also relates to a process for operating this equipment. See generally "Degrémont Handbuch - Wasseraufbereitung und Abwasserreinigung [Handbook of Water Treatment and Effluent Purification]", published by Bauverlag GmbH, Wiesbaden and Berlin 1974, pages 242–244.

BACKGROUND OF THE INVENTION

When carrying out process engineering operations, it is frequently necessary to contact a liquid with a gas, referred to as the process gas, for the purpose of mass transfer. The conditions arising in these processes are very diverse. Accordingly, there are also numerous possible design variants. Generally, the gassing equipment must meet the following requirements:
 high absorption efficiency
 operational reliability
 low hydraulic head
 small constructional volume
 low investment costs
 low operating costs
 variable throughput without significant losses in efficiency.

When gassing a liquid, the gas is dispersed into small bubbles with the aid of a suitable apparatus and is then dissolved in the liquid in a reactor section, referred to as the bubble column. The required residence time in the reactor section mainly depends on the maximum initial bubble radius and on the rate of dissolution. In practice, the gas-dispersing apparatus must meet the requirement that the maximum bubble radius does not exceed a defined (very small) size. Otherwise, the required residence time and the reactor section become very long, and the process becomes uneconomical. This applies in particular to processes in which a liquid is to be treated with ozone or an ozone-containing gas, since a comparatively large energy must be supplied in the generation of ozone, and unconsumed ozone can be recovered only with great difficulty.

In the known types of equipment for gassing liquids with ozone, essentially the following processes are used:
 blowing ozone-containing gas in by means of a special turbine
 blowing ozone-containing gas in through porous pipes or bodies
 blowing ozone-containing gas in by means of an injector.

In the first mentioned process, the water to be treated is introduced into the suction zone of a turbine which has a special profile and which forces the water downwards against a stream of ozonized air which is blown in below the turbine. In the bubble column zone close to the turbine, a fine dispersion zone (ozonized air/water) is created. The finely dispersed ozonized air/water mixture is again passed through the turbine, the throughput of the turbine being a multiple of the quantity of water to be treated. After this mixing, the gas-/water emulsion rises in a second unit where the contact continues. In this way, bubble lives of more than one minute can be realized (op. cit., page 243, FIG. 167).

In the second process, porous pipes are fitted in the lower part of a bubble column, the ozonized air flowing out of these pipes in very small bubbles. The water to be ozonized flows into the upper part of the bubble column. Intimate counter-current contact of the two media is thus achieved. The bubble columns can also be designed with several units, part injections of ozonized air likewise taking place preferably in counter-current. The residence time of the bubbles and hence the absorption efficiency, however, is here far lower than that of the turbine mixing process (op. cit., page 243, FIG. 166).

In the third process—blowing the ozonized air in by means of an injector—there are two alternatives to be distinguished:

If a water pressure of at least 2 m water gauge is available, an ejector can be operated by this pressure. In this case, the total quantity of water to be treated is blown through the ejector, which at the same time aspirates the ozonized air and feeds the bubble column from below (op. cit., page 244, FIG. 168).

If the available pressure is less than 2 m water gauge, the quantity of water to be treated is divided into two unequal parts. The pressure of the smaller part is raised by means of a pump, so that the ejector for the ozonized air can be operated. The remaining, unozonized throughput is passed with the natural gradient into the lower part of the bubble column. The effectiveness of this method leaves something to be desired, since the two parts of water are subjected to different treatments and the distribution of ozone is thus not homogeneous.

OBJECTS OF THE INVENTION

Starting from the state of the art described above, it is the principal object of the invention to provide equipment for gassing liquids which meets the requirements listed above in an optimum manner. In particular, it is a principal object of the invention to provide such equipment which has to a high absorption efficiency.

A further object of the invention is to provide a process for operating this eqipment.

SUMMARY OF THE INVENTION

In equipment of the generic type mentioned at the outset, the foregoing objects are achieved according to the invention by providing upstream of the first gassing stage, a second gassing stage in which the process gas leaving the first gassing stage and hence only partially spent is contacted with the liquid being fed to the first gassing stage.

The invention is based on the following considerations: a counter-current mass transfer favorable with respect to absorption efficiency cannot be realized in large-scale installations. In practice, a mixing system or co-current transfer must always be expected. In such co-current transfers, the absorption efficiency is limited by the equilibrium of the ozone in the two phases. This theoretical efficiency in equilibrium also depends, in addition to depending on the partition coefficient, on the volumetric gas/liquid flow ratio. In the equipment according to the invention, at least the second gassing stage is operated in counter-current, partially "spent" process gas being contacted with "fresh" liquid. This leads to a substantial improvement in the overall absorption efficiency. Furthermore, changes in efficiency caused, for example, by different throughput are largely compensated for automatically in the individual gassing stages. If, furthermore, the flow velocity of the liquid in the bubble column is set to approximately the same value as the rate of rise of the process gas bubbles, an extremely high gas fraction, amounting to up to 50% by volume, is achieved in the bubble column due to the bubbles being suspended or floating in the bubble column. Due to the correspondingly large mass transfer area, the constructional volume is considerably reduced. This is important precisely for the preferred application of the invention (namely, the ozonization of water), since large quantities of water must be treated in this case.

According to a first further development of the equipment according to the invention, the second gassing stage is formed by a shower tray which is arranged above the bubble column and spatially at a distance from the latter. The shower tray is charged with the liquid to be gassed. Thus, the two gassing stages can be combined in the form of a single structural unit which takes up only a small ground area. The residual gas rising from the bubble column and still containing a greater or lesser fraction of process gas comes into counter-current contact with the liquid dropping down from the shower tray and continues to be absorbed. The residual gas from the second gassing stage is advantageously withdrawn from the space between the shower tray and the bubble column just below the shower tray. Although absorption efficiencies of about 95% can be achieved with the equipment according to the invention, it may be necessary or even advantageous in some cases to feed this residual gas to further gassing equipment of the type disclosed herein.

According to a preferred embodiment of the invention, the bubble column has two chambers. In one of the chambers, which immediately adjoins the space below the shower tray, a submerged gas distributor is located. The other chamber has a free connection to the first chamber, below the submerged gas distributor, and is open towards the space below the shower tray. In this way, maximum residence time of the process gas in the bubble column is obtained. Depending on the flow velocity of the liquid in the bubble column and on the inherent velocity of the gas bubbles (which is on the order of magnitude of 0.2 m/second), the stream of gas bubbles distributes itself to one chamber or the other. The partially "spent" process gas leaving the two chambers necessarily passes into the second gassing stage that is to say, into space below the shower tray.

A preferred embodiment of the invention, which represents a constructionally simple solution of the arrangement of the two chambers, makes possible a coaxial arrangement of the first and second gassing stages.

The submerged gas distributors used can be virtually any mixing devices, of which many examples are known. For instance, the submerged gas distributors may be so-called "radial gas distributors", such as are described in the article "Versuche über die Ozonisierung von Wasser mit neuartigem Radialbegaser [Experiments on the ozonization of water with a novel radial gas distributor]", published in "Gesundheitstechnik (Z. G. Umweltschutz)" No. 10/October 1973. However, so-called "static mixers", or two-material nozzles, such as are described, for example, in Swiss Patent Specification No. 564,966 and are called spiral mixers therein, are also particularly advantageous. The spiral mixers are based on the use of a tubular device in which the media to be mixed flow in a spiral stream and are subjected to additional shear forces. In the present application, however (in contrast to known applications), the process gas and the total quantity of the liquid to be treated are not passed through the submerged gas distributor, but only a fraction of the liquid to be treated and the entire process gas are fed to the submerged gas distributor. For energy reasons, this fraction is at most about 15% in the ozonization of water, while the remaining quantity of liquid is fed to the second gassing stage. The pump power which must be provided thus remains modest.

BRIEF DESCRIPTION OF THE DRAWINGS

The invention is explained in more detail below by reference to an illustrative embodiment shown in the single drawing .

DETAILED DESCRIPTION OF THE PRESENTLY PREFERRED EMBODIMENT

In a greatly simplified presentation, the drawing shows equipment for the ozonization of water. Oxygen or an oxygen-containing gas is fed to an ozonizer 1 and is enriched therein with ozone. The pressurized process gas leaving the ozonizer is fed to one inlet of a mixer 2. The other inlet of the mixer 2 is connected to the outlet of a pump 3 which is fed by a line 12 from a tank 4 containing water. A line 5 passes the process gas and the water to a submerged gas distributor 6 which is designed as a static mixer. The submerged gas distributor projects into the lower vessel part 7" of a cylindrical vessel 7. The vessel 7 has an upper continuation, namely the upper part 7' of the vessel, which is likewise cylindrical and is, for example, integrally joined thereto and in which a shower tray 8 is arranged. The shower tray 8 includes a plate which extends across the entire cross-section of the upper part 7' of the vessel 7. The shower tray 8 is perpendicular to the axis of the vessel 7 and has a multiplicity of through-holes 9. The space above the shower tray 8 is connected via a connection 10 and a line 11 to the tank 4. The line cross-sections of the line 11 from the tank 4 to the vessel 7 and of the connecting line 12 inbetween the tank 4 and the pump 3 and the gradient from the tank 4 to the upper part 7' of the vessel and the shower tray 8 are sized such that at least 85% and preferably about 90% of the total water fed to the vessel 7 flows through the line 11 and the remaining quantity of water flows through the pump 3 and the line 5.

The lower part 7" of the vessel 7 is concentrically surrounded by an outer vessel 13. The annular space 14 between the lower part 7" of the vessel 7 and the outer vessel 13 is freely connected to the interior of the lower part 7" of the vessel 7 via large-area orifices 15 near the bottom of the lower part 7" of the vessel 7 and also via perforations 16 in the lower part 7" of the vessel 7 above the normal level of water therein. The lower part 7" of the vessel 7 and the annular space 14 form the two chambers of the bubble column. Treated water leaves the annular space 14 via an outflow 17, provided with a baffle 18, at the upper end of the outer vessel 13. The level 19 of the outflowing (treated) water is lower than the level 20 of the water in the interior of the lower part 7" of the vessel 7, which level in turn is lower than the perforations 16 in the wall of the lower part 7" of the vessel 7. The space 21 between the lower part 7" of the vessel 7 and the shower tray 8 forms the second gassing stage. The residual gas is discharged from this second gassing stage below the shower tray 8 via a line 22 which ends in the shower tray 8.

OPERATION OF THE PREFERRED EMBODIMENT

The mode of action of the equipment, just described, for the ozonization of water is described in the text which follows, a vessel 7 already filled with water up to the static level 23 being assumed. The gas mixture enriched with ozone is combined in the mixer 2 with the partstream of water downstream of the pump 3. Intensive mixing of water and process gas takes place once more in the submerged gas distributor 6, the quantity of gas being dispersed into a multiplicity of small and very small gas bubbles. These gas bubbles distribute themselves in the inner chamber of the lower part 7" of the vessel 7. If water is fed at the same time into the space above the shower tray 8, this water passes in fine distribution through the holes 9 in the shower tray 8 and reaches the inner chamber in free fall. On the way there, the water comes into contact with the process gas leaving the first gassing stage and already depleted of ozone. The water running down is thus enriched with ozone even before it enters the first gassing stage. Due to the water rate fed in, the level in the inner chamber rises, so that steady liquid levels 19, 20 are established in the first gassing stage after a short time. Analogously, a steady level 24 will also be established above the shower tray 8.

Due to the inflow (with the outflow open), a downward liquid flow forms in the inner chamber (symbolized by the arrows 25), and an upward liquid flow forms in the annular space 14 (symbolized by the arrows 26). Depending on the magnitude of the total quantity of water fed into the system, a certain mean flow velocity of the water is also established in the interior of the vessel. Depending on the size of the gas bubbles and their flow velocity, the gas bubbles are either carried along downwardly, remain in a suspended state, or float up—that is to say, float against the direction of the water flow at a velocity which is lower than the "static" rate of rise. Even in the "most unfavorable" case, where the gas bubbles are carried downwardly by the flow, the residence time of the gas bubbles in the water on the way to the vessel bottom and from there through the orifices 15 into the annular space 14 remains sufficiently long. Process gas escaping from the liquid in the annular space 14 passes through the perforations 16 into the second gassing stage and comes into interaction with the water dropping down. These explanations show that the overall absorption efficiency is only slightly dependent on the throughput, since with decreasing efficiency of one stage, the efficiency of the other gassing stage necessarily increases.

Without departing from the scope defined by the patent claims, diverse modifications and embodiments of the invention are possible.

Thus, a radial gas distributor or an injector of known design can take the place of the static mixer 6. The disadvantages, described in connection with the state of the art, of the embodiment according to "Degrémont-Handbuch", op. cit., page 244, FIG. 168, second alternative, do not arise here, since the special design of the first gassing stage and the passing of liquid therein make homogeneous gassing possible, and the homogeneous gassing is further reinforced by the action of the second stage.

An embodiment without previous mixing of a part of the water which is to be treated with the process gas has also proved to be advantageous. In this case, only the process gas is passed through porous pipes which are, for example, located in the first gassing stage, or the process gas is fed separately from the (smaller) part quantity of liquid to the submerged gas distributor, which is then designed as a two-material nozzle. All the other mechanisms and reactions take place in the way previously described. Particularly in the case of modern ozone generators, in which the gas enriched with ozone leaves the ozone generator under an excess pressure and is then passed directly into a conventional submerged gas distributor, separate pressure generators are then unnecessary.

It is of course also within the scope of the invention to design the submerged gas distributor as a so-called turbine mixer and to use the turbine mixer in the first gassing stage in place of the static mixer.

The invention has been described by reference to an illustrative embodiment for the ozonization of water. Of course, the equipment is also suitable for different process engineering applications, where a different gas or gas mixture is to be contacted with a liquid.

I claim:

1. Equipment for gassing a liquid with ozone, said equipment comprising:
   (a) an upwardly open bubble chamber which, during use of the equipment, contains liquid up to a first level which is lower than the top of said upwardly open bubble chamber;
   (b) a downwardly open trickle chamber located immediately above and in fluid communication with said upwardly open bubble chamber such that, during use of the equipment, liquid falling through said trickle chamber falls directly into said bubble chamber;
   (c) first means for causing a major portion of the liquid to fall through said trickle chamber in a plurality of spaced paths;
   (d) an enclosed chamber which, during use of the equipment, contains liquid up to a second level which is lower than the top of said enclosed chamber, said enclosed chamber having a discharge opening and a baffle which prevents the escape of the ozone through said discharge opening;
   (e) an ozone distributor located in said upwardly open bubble chambers;
   (f) second means for feeding a mixture of a minor portion of the liquid and all of the ozone to said ozone distributor;
   (g) a first path of fluid communication leading from the bottom of said upwardly open bubble chamber to said enclosed chamber at a point beneath said discharge opening;
   (h) a second path of fluid communication leading from said enclosed chamber above said second level to the bottom of said downwardly open trickle chamber; and
   (i) a third path of fluid communication leading from the top of said trickle chamber,
   whereby, during use of the equipment, ozone flows from said ozone distributor and, depending on the speed that the liquid flows downwardly through said bubble chamber, either:
      (i) bubbles to the top of the liquid in said bubble chamber and then passes in counter-current fashion through the falling liquid in said trickle chamber and into said third path of fluid communication or (ii) passes into said enclosed chamber through said first path of fluid communication, bubbles to the top of the liquid in said enclosed chamber, passes into said trickle chamber through said second path of fluid communication, and then passes in counter-current fashion through the falling liquid in said trickle chamber and into said third path of fluid communication.

2. Equipment for gassing a liquid with ozone, said equipment comprising:

(a) a first gassing stage in the form of a vessel which serves as a bubble chamber;

(b) a second gassing stage in the form of a vessel which serves as a trickle chamber, said second stage being located above said first gassing stage and being in fluid communication with said first gassing stage;

(c) an annular chamber surrounding said first gassing stage, said annular chamber being:

(i) in fluid communication with said first gassing stage by means of at least one outlet located in the lower part of said first gassing stage and leading to a lower part of said annular chamber and (ii) in fluid communication with said second gassing stage by means of at least one outlet located in the upper part of said annular chamber and leading to a lower part of said second gassing stage;

(d) an ozone distributor located in said first gassing stage above the outlet therein leading to said annular chamber;

(e) an outflow in fluid communication with said annular chamber, said outflow having a discharge opening and a baffle which prevents the escape of the ozone through said discharge opening;

(f) first means for feeding a major portion of the liquid to be gassed to the top of second gassing stage, through which the major portion of the liquid to be gassed falls to said first gassing stage in a plurality of spaced paths; and (g) second means for feeding a mixture of a minor portion of the liquid to be gassed and all of the ozone to said ozone distributor, whereby, during use of the equipment, ozone flows from said ozone distributor and, depending on the speed that the liquid flows downwardly through said first gassing stage, either:

(i) bubbles to the top of the liquid in said first gassing stage and then passes in counter-current fashion through the falling liquid in said second gassing stage or (ii) passes into said annular chamber through the outlet in the lower part of said first gassing stage, bubbles to the top of the liquid in said annular chamber, passes into said second gassing stage through the outlet in the upper part of said annular chamber, and then passes in counter-current fashion through the falling liquid in said second gassing stage.

3. Equipment as recited in claim 2 wherein the liquid to be gassed enters said second gassing stage through a shower tray.

4. Equipment as recited in claim 2 and further comprising means for venting the ozone from the top of said second gassing stage.

5. Equipment as recited in claim 2 wherein said ozone distributor is an agitating mixer.

6. Equipment as recited in claim 2 wherein said ozone distributor is a tubular mixer.

7. Equipment as recited in claim 2 wherein said ozone distributor is a static mixer.

8. Equipment as recited in claim 2 wherein said first means causes at least 85% of the total liquid to be gassed to be fed to the top of said second gassing stage.

9. Equipment as recited in claim 8 wherein said first means causes about 90% of the total liquid to be gassed to be fed to the top of said second gassing stage.

* * * * *